(12) United States Patent
Scott et al.

(10) Patent No.: US 10,007,395 B2
(45) Date of Patent: Jun. 26, 2018

(54) METHOD FOR PREDICTING MESSAGING ADDRESSES FOR AN ELECTRONIC MESSAGE COMPOSED ON AN ELECTRONIC DEVICE

(71) Applicant: BlackBerry Limited, Waterloo (CA)

(72) Inventors: Sherryl Lee Lorraine Scott, Waterloo (CA); Mihal Lazaridis, Waterloo (CA); Jason Tyler Griffin, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 444 days.

(21) Appl. No.: 13/693,986

(22) Filed: Dec. 4, 2012

(65) Prior Publication Data
US 2013/0097527 A1    Apr. 18, 2013

Related U.S. Application Data

(63) Continuation of application No. 12/609,058, filed on Oct. 30, 2009, now Pat. No. 8,341,230.

(51) Int. Cl.
*G06F 3/0482* (2013.01)
*G06Q 10/10* (2012.01)
*H04L 12/58* (2006.01)

(52) U.S. Cl.
CPC ......... *G06F 3/0482* (2013.01); *G06Q 10/107* (2013.01); *H04L 51/28* (2013.01)

(58) Field of Classification Search
CPC .............. G06F 3/00; H04M 1/274558; H04M 1/72519–1/172561
See application file for complete search history.

(56) References Cited

U.S. PATENT DOCUMENTS 6,005,928 A * 12/1999 Johnson ................ H04L 63/083
                                                              379/100.08
6,829,607 B1   12/2004 Tafoya et al.
(Continued)

FOREIGN PATENT DOCUMENTS

CA       2498368 C     11/2011
EP       1569478 A1    8/2005
(Continued)

OTHER PUBLICATIONS

Viets, A.; Search Report from corresponding European Application No. 09174565.3; search completed Nov. 27, 2009.
(Continued)

*Primary Examiner* — Jeffrey A Gaffin
*Assistant Examiner* — Mandrita Brahmachari
(74) *Attorney, Agent, or Firm* — Thomas Grzesik; Fleit Gibbons Gutman Bongini & Bianco P.L.

(57) ABSTRACT

A method for predicting messaging addresses for an electronic message composed on an electronic device is provided. In accordance with one embodiment, the method comprises: receiving a request to compose an electronic message; automatically filtering the contacts based on filter criteria comprising a type of the electronic message to generate a first list of contacts; displaying a message composition user interface screen on a display screen of the electronic device, the message composition user interface screen including one or more address fields for inputting message recipients; displaying the first list of contacts, the message recipients being selectable from the first list of contacts; and selecting a messaging address in accordance with selection of a contact from the first list of contacts and populating an active address field in the message composition user interface screen with the selected contact.

21 Claims, 7 Drawing Sheets

(56) References Cited

U.S. PATENT DOCUMENTS

| | | | |
|---|---|---|---|
| 6,952,805 B1 | 10/2005 | Tafo"Ya et al. | |
| 7,233,803 B2 | 6/2007 | Nielsen et al. | |
| 7,290,033 B1 | 10/2007 | Goldman et al. | |
| 7,580,363 B2 | 8/2009 | Sorvari et al. | |
| 8,938,506 B2 * | 1/2015 | Moody | G06Q 10/107 709/204 |
| 2002/0103873 A1 * | 8/2002 | Ramanathan | G06Q 10/107 709/206 |
| 2004/0059784 A1 | 3/2004 | Caughey | |
| 2004/0215726 A1 | 10/2004 | Arning et al. | |
| 2005/0055413 A1 * | 3/2005 | Keohane et al. | 709/207 |
| 2005/0131888 A1 | 6/2005 | Tafoya et al. | |
| 2005/0198144 A1 | 9/2005 | Kraenzel et al. | |
| 2005/0261011 A1 * | 11/2005 | Scott | G06Q 10/10 455/466 |
| 2006/0004843 A1 * | 1/2006 | Tafoya et al. | 707/102 |
| 2006/0035632 A1 * | 2/2006 | Sorvari et al. | 455/418 |
| 2006/0047644 A1 | 3/2006 | Bocking et al. | |
| 2006/0167991 A1 | 7/2006 | Heikes et al. | |
| 2006/0223530 A1 | 10/2006 | Bumiller | |
| 2006/0248153 A1 * | 11/2006 | Hejza Litwiller | H04L 63/083 709/206 |
| 2007/0155411 A1 * | 7/2007 | Morrison | 455/466 |
| 2008/0065472 A1 * | 3/2008 | Patrick et al. | 705/10 |
| 2008/0071774 A1 * | 3/2008 | Gross | 707/5 |
| 2008/0104177 A1 * | 5/2008 | Keohane | G06Q 10/107 709/206 |
| 2008/0133580 A1 | 6/2008 | Wanless et al. | |
| 2008/0172466 A1 | 7/2008 | Tonegawa et al. | |
| 2008/0208984 A1 * | 8/2008 | Rosenberg | G06Q 10/107 709/206 |
| 2008/0256107 A1 | 10/2008 | Banga et al. | |
| 2008/0282164 A1 * | 11/2008 | Blass | G06F 17/30861 715/719 |
| 2008/0313283 A1 * | 12/2008 | Cohen | G06Q 10/107 709/206 |
| 2009/0157693 A1 * | 6/2009 | Palahnuk | 707/10 |
| 2009/0210504 A1 | 8/2009 | Shuster | |
| 2009/0221323 A1 | 9/2009 | Yach | |
| 2009/0240657 A1 | 9/2009 | Grigsby et al. | |
| 2010/0017607 A1 | 1/2010 | Shkolnikov et al. | |
| 2010/0161318 A1 | 6/2010 | Lowles et al. | |
| 2010/0223547 A1 | 9/2010 | Wilson et al. | |
| 2011/0047246 A1 | 2/2011 | Frissora et al. | |

FOREIGN PATENT DOCUMENTS

| | | |
|---|---|---|
| EP | 1785924 A1 | 5/2007 |
| EP | 2073502 A1 | 6/2009 |
| GB | 2357932 A | 7/2001 |
| WO | WO 03/098425 A1 | 11/2003 |
| WO | WO 2006/102747 A1 | 10/2006 |
| WO | WO 2009/017040 A1 | 2/2009 |

OTHER PUBLICATIONS

Outlook Inbox Panel; http://www.desktopsidebar.com/htmlhelp/inbox.htm; Feb. 2, 2010.
European Examination Report dated Jul. 1, 2016, received for European Application No. 09174565.3.
Canadian Office Action dated Jun. 28, 2013 received in connection with Canadian Patent Application No. 2,714,529.
Canadian Office Action dated Jun. 19, 2014 received in connection with Canadian Patent Application No. 2,714,529.

\* cited by examiner

METHOD FOR PREDICTING MESSAGING ADDRESSES FOR AN ELECTRONIC MESSAGE COMPOSED ON AN ELECTRONIC DEVICE

TECHNICAL FIELD

The present disclosure relates to electronic messages and, more particularly, to methods for predicting messaging addresses for an electronic message composed on an electronic device.

BACKGROUND

Electronic messages such as email messages are associated with one or more addresses which specify a recipient of the electronic message. The addresses may be individual addresses of individual recipients, or a group identifier or address depending on the type of electronic message. The type of address depends on the type of electronic message. For example, email messages have email addresses specifying one or more recipients of the email message. Similarly, text messages or short messaging service (SMS) messages have one or more telephone numbers specifying one or more recipients for the text message.

Users are typically provided an opportunity to specify one or more addresses associated with an electronic message during the composition of the electronic message. The addresses can be specified directly via user input or indirectly by selecting the recipient names or other information, for example, via an address book application. Manually inputting the addresses is time consuming, especially when inputting is required for frequently used contacts. Address book applications are useful; however, contact records in address books are typically presented alphabetically by name. Accordingly, users are often required to scroll through the address book to locate the recipient names and then select them. When a large number of contacts are stored in the address book, this process can be also be quite time consuming. Address book lookup operations may simplify this process somewhat, but such operations are often limited to name searches.

When placing a telephone call, users may select a phone number from a call log using a telephone application. A call log is a collection of numbers and/or contact names from which a call was recently received or to which a call was recently placed. A call log typically includes the telephone numbers and/or contact names for contacts saved in a user's address book as well as telephone numbers that are not in the user's address book. A user can place a telephone call to a recipient listed in the call log by selecting the corresponding entry in the call log. While useful, call logs are limited to telephone numbers and the entries in call logs are often limited in time (e.g., entries are purged after a predetermined duration) and scope (e.g., only contacts with telephone activity are listed).

In view of these and other deficiencies in message addressing, there remains a need for improved methods for addressing electronic messages.

BRIEF DESCRIPTION OF THE DRAWINGS

Similar reference numerals may have been used in different figures to denote similar components.

DETAILED DESCRIPTION OF EXAMPLE EMBODIMENTS

Figure 1:
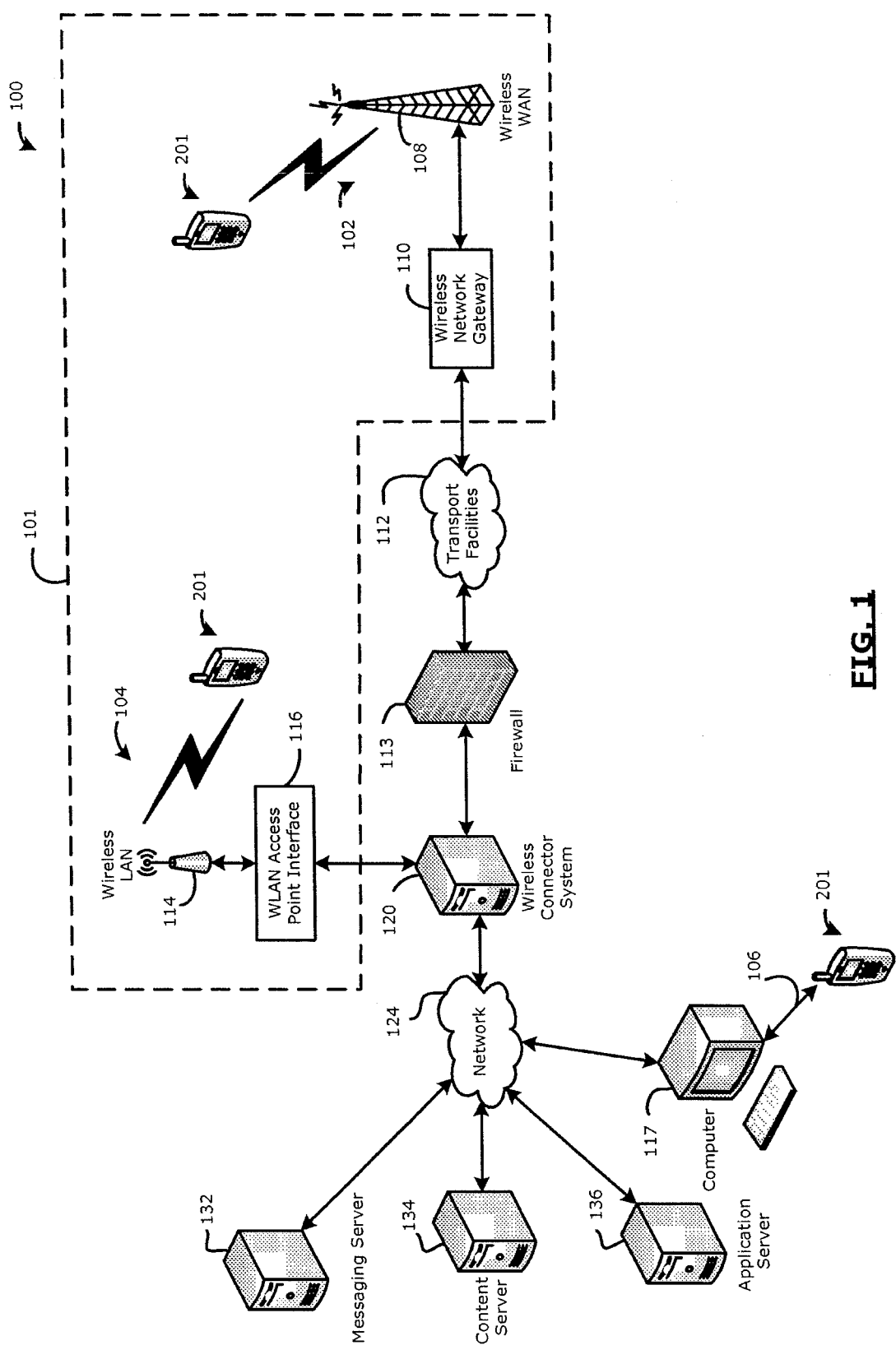
FIG. 1 is a block diagram illustrating a communication system in which example embodiments of the present disclosure can be applied.

In accordance with one embodiment of the present disclosure, there is provided a method for predicting messaging addresses for an electronic message composed on an electronic device, the electronic device having access to contact information for a number of contacts, the method comprising: receiving a request to compose an electronic message; automatically filtering the contacts based on filter criteria comprising a type of the electronic message to generate a first list of contacts; displaying a message composition user interface screen on a display screen of the electronic device, the message composition user interface screen including one or more address fields for inputting message recipients; displaying the first list of contacts, the message recipients being selectable from the first list of contacts; and selecting a messaging address in accordance with selection of a contact from the first list of contacts and populating an active address field in the message composition user interface screen with the selected contact.

In accordance with another embodiment of the present disclosure, there is provided a method for predicting messaging addresses for an electronic message composed on an electronic device, the electronic device having access to contact information for a number of contacts, the method comprising: receiving a request to compose an electronic message; automatically filtering the contacts based on filter criteria comprising a type of messaging address; displaying a message composition user interface screen on a display screen of the electronic device, the message composition user interface screen including one or more address fields for inputting message recipients, wherein the address field is automatically populated with one or more contacts matching the filter criteria; and sending the electronic message to one or more messaging addresses in response to respective input.

Contacts may have one or more of a number of different types of messaging addresses in the above-described embodiments. In such cases, a mobile communication device and/or its associated messaging server stores contact information including one or more messaging addresses for at least some of the contacts. The contact information for each contact may comprise one or more types of messaging addresses, each type of messaging address being associated with a particular type of electronic message.

In accordance with a further embodiment of the present disclosure, there is provided a mobile communication device having access to contact information for a number of contacts, the contact information including messaging addresses for at least some of the contacts, the device comprising: a controller; an input device connected to the controller for receiving input; a communication subsystem connected to the controller for exchanging data over a wireless network; a memory connected to the controller having stored thereon address usage data specifying historical usage of one or more messaging addresses; a display screen connected to the controller; wherein the controller is configured to perform various embodiments of the method described herein.

In accordance with a further embodiment of the present disclosure, there is provided a computer program product comprising a computer readable medium having stored thereon executable program code for causing an electronic device to perform the methods described in the present disclosure.

The example embodiments of the present disclosure are not limited to any particular operating system, mobile device architecture, server architecture, or computer programming language.

In order to facilitate an understanding of one possible environment in which example embodiments described herein can operate, reference is first made to FIG. 1 which shows in block diagram form a communication system 100 in which example embodiments of the present disclosure can be applied. The communication system 100 comprises a number of mobile communication devices 201 which may be connected to the remainder of the system 100 in any of several different ways. Accordingly, several instances of mobile communication devices 201 are depicted in FIG. 1 employing different example ways of connecting to the communication system 100. Mobile communication devices 201 are connected to a wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201.

The WWAN 102 may further comprise a wireless network gateway 110 which connects the mobile communication devices 201 to transport facilities 112, and through the transport facilities 112 to a wireless connector system 120. Transport facilities 112 may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realized using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or WiMAX), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201.

The wireless network gateway 110 is adapted to send data packets received from the mobile communication device 201 over the WWAN 102 to the wireless connector system 120. The wireless connector system 120 then sends the data packets to the appropriate connection point such as the messaging server 132, content server 134 or application servers 136. Conversely, the wireless connector system 120 sends data packets received, for example, from the messaging server 132, content server 134 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134 and application server 136.

The messaging server 132 may manage and store an enterprise contact information database (also referred to as a global address book database) (not shown) as well as synchronized copies of contact information databases of respective users (also referred to as personal address book databases). As understood to persons skilled in the art, the global address book database comprises electronic contact records created and maintained by an IT (information technology) administrator of the network 124. Typically, the global address book database is maintained exclusively by the messaging server 132 and there is no local copy on the mobile communication devices 201; however, it is possible that a local copy is stored in the devices 201. In addition, the global address book database typically comprises contact records for all users of the respective network 124 (e.g., enterprise). The contact records in the global address book database may be one or more of individual contact records (or user records) or a group address or distribution list which lists multiple individual (users).

The network 124 may comprise a private local area network, metropolitan area network, wide area network, the public Internet or combinations thereof and may include virtual networks constructed using any of these, alone, or in combination.

Mobile communication devices 201 may alternatively connect to the wireless connector system 120 using a computer 117, such as desktop or notebook computer, via the network 124. A link 106 may be provided for exchanging information between the mobile communication device 201 and computer 117 connected to the wireless connector system 120. The link 106 may comprise one or both of a physical interface and short-range wireless communication interface.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with other types of networks and associated devices that are effective in implementing or facilitating wireless communication. Suitable variations of the communication system will be understood to a person of skill in the art and are intended to fall within the scope of the present disclosure.

Figure 2:
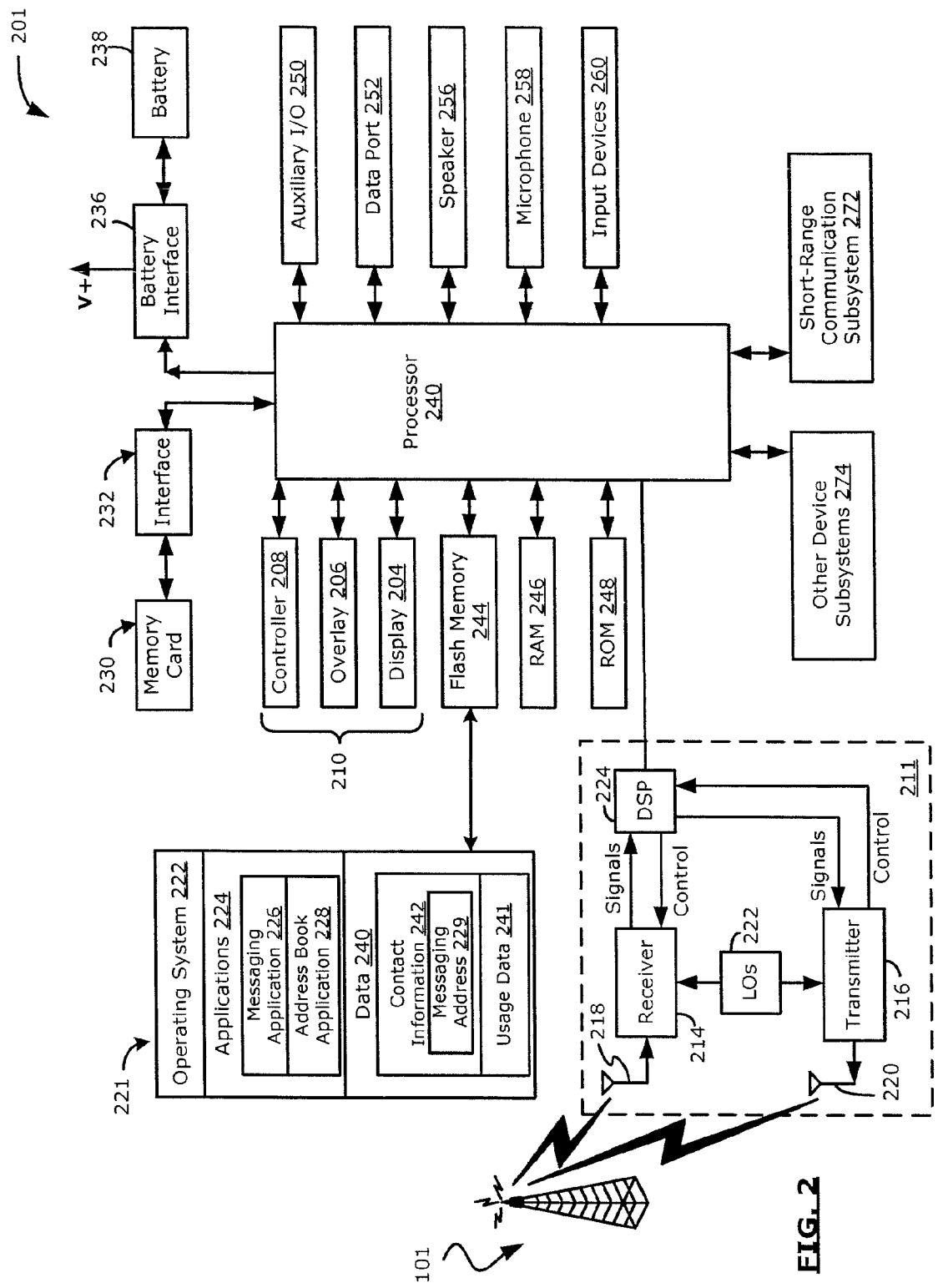
FIG. 2 is a block diagram illustrating a mobile communication device in accordance with one example embodiment of the present disclosure.

Reference is now made to FIG. 2 which illustrates a mobile communication device 201 in which example embodiments described in the present disclosure can be applied. The mobile communication device 201 is a two-way communication device having at least data and possibly also voice communication capabilities, and the capability to communicate with other computer systems, for example, via the Internet. In at least some embodiments, the mobile communication device 201 is a handheld device.

The mobile communication device 201 includes a controller comprising at least one processor 240 such as a microprocessor which controls the overall operation of the mobile communication device 201, and a wireless communication subsystem 211 for exchanging radio frequency signals with the wireless network 101. The processor 240 interacts with the communication subsystem 211 which performs communication functions. The processor 240 interacts with additional device subsystems. In some embodiments, the device 201 may include a touchscreen display 210 which includes a display (screen) 204, such as a liquid crystal display (LCD) screen, with a touch-sensitive input surface or overlay 206 connected to an electronic controller 208. The touch-sensitive overlay 206 and the electronic controller 208 provide a touch-sensitive input device and the processor 240 interacts with the touch-sensitive overlay 206 via the electronic controller 208. In other embodiments, the display 204 may not be a touchscreen display. Instead, the device 201 may simply include a non-touch display and one or more input devices 260 such as, for example, a navigation tool such as a depressible scroll wheel or trackball.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, the input devices 260, short-range communication subsystem 272, and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile communication device 201 and a single antenna may be shared by both receiver and transmitter, as is known in the art. As will be apparent to those skilled in the field of communication, the particular design of the communication subsystem 211 depends on the wireless network 101 in which the mobile communication device 201 is intended to operate.

The mobile communication device 201 may communicate with any one of a plurality of fixed transceiver base stations 108 (FIG. 1) of the wireless network 101 within its geographic coverage area. The mobile communication device 201 may send and receive communication signals over the wireless network 101 after a network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. ND conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244.

As illustrated in FIG. 2, the software modules 221 comprise operating system software 222, software applications 224 which include a messaging application 226 and, in at least some embodiments, an address book application 228. The messaging application 226 permits a user to compose an electronic message, such as an email message or a short message service (SMS) text message. The messaging application 226 may also permit a user of the device 201 to view electronic messages received on the device 201, reply to electronic messages received on the device 201, and to send electronic messages 201 composed on the device 201 from the device 201 to other computers, users, or devices; for example, through the communication subsystem 211.

The address book application 228 provides a user interface for managing contact information 242. The address book application 228 is configured to allow users to view, add, delete, and/or modify contact information 242 associated with one or more contacts. The address book application 228 and the email messaging application 226 may, in various embodiments, be: integrated with and/or provided by the operating system 222; stand-alone applications 224; or integrated into a single messaging application which provides the functionality of both the messaging application 226 and the address book application 228.

The mobile communication device 201 stores data 240 in an erasable persistent memory, which in one example embodiment is the flash memory 244. The data 240 includes service data and user application data. The service data comprises information required by the mobile communication device 201 to establish and maintain communication with the wireless network 101. The user application data may include such as email messages (not shown), contact information 242, calendar and schedule information (not shown), notepad documents (not shown) and image files (not shown).

The user application data stored in the memory 244 also includes contact information 242 associated with a plurality of contacts. The contacts may include individuals and/or businesses, such as persons or businesses associated with one or more users of the mobile communication device. The contacts may also be categorized according to these individual and businesses categories. Individuals or businesses may also be saved as part of a group. The contact information 242 includes one or more messaging addresses 229 associated with at least one of the contacts. Each messaging address 229 specifies an address, such as an email address or a telephone number, which may be used by the contact for receiving electronic messages. The contact information 242 may be stored in a contact information database (sometimes referred to as an address book database or merely address book, contact list or contacts). Each contact in the contact information 242 may have a contact record in the contact information database which is accessible by the address book application 228. In some embodiments, the contact information 242 may be stored in a remote contact information database in addition to, or instead of, the memory 244. The remote contact information database is typically stored and managed by the messaging server 132, or could be stored and managed by another network component such as the wireless connector system 120. Some or all of the contact information 242 could be synchronized between the local and remote contact information databases, depending on the embodiment. In addition, the user application data including contact information 242 may be synchronized with a user's host computer 117 in whole or in part in some embodiments.

It will be appreciated that, in some embodiments, the contact information 242 may include various categories or types of messaging addresses 229. For example, the messaging address 229 may be categorized as an email address, a telephone number associated with SMS messaging, an instant messaging address, or a unique identifier such as a personal identification number (PIN) which is associated with a specific mobile communication device 201 or user.

A messaging address 229 is an address for use in sending an electronic message of a given type. The messaging addresses 229 could be, but not limited to, a mobile telephone number for a mobile telephone capable of receiving SMS and/or MMS messages, an email address, an instant messaging (IM) identifier or address for an IM network, a user or device identifier such as a PIN for sending device-to-device messages (also referred to as peer-to-peer messages or PIN messages), an identifier within a private or proprietary communication system or network such as Facebook™MySpace™ or Blackberry Groups™, or a SIP URI (session initiation protocol uniform resource identifier) for a Voice over Internet Protocol (VoIP) network. Contact identifiers could include predetermined types of identifying information which are not messaging addresses 229 including, but not limited to, identifying information for a Blog, Really Simple Syndication (RSS) feed identifying information, or a landline telephone number for a telephone on a public switched telephone network (PSTN).

The data 240 stored in memory 244 also includes usage data 241 which includes usage information that identifies historical usage of contact identifiers such as contact names and messaging addresses 229. The historical usage may relate to the use of contact identifiers stored in a personal address book database, contact identifiers stored in a global address book database, contact identifiers which are not stored in the personal or global address book databases but are stored in an application history in the memory 244 of the device 201 (e.g., such as a call log), or any combination thereof depending on the embodiment. For example, a telephone number which is not in the personal address book database or global address book database but which is found in the call log of a phone application may have associated usage data 241.

Where the contact information 242 includes multiple categories of messaging addresses 229, the address usage information in the usage data 241 may contain usage information for multiple categories of messaging addresses. For example, the usage data 241 may include usage information related to the historical usage of messaging addresses in a first category (i.e. email messaging addresses) and usage information related to historical usage of messaging addresses in a second category (i.e. SMS messaging addresses). By way of further example, the usage data 241 may include first usage information which specifies the last used messaging address in a first category (i.e. email messaging address) and second usage information which specifies the last used messaging address in a second category (i.e. SMS messaging addresses). As will be explained in greater detail below, in at least some embodiments, the messaging application 226 is configured to track the historical usage of contact identifiers such as messaging addresses 229 or other predetermined type of identifying information (e.g. contact names).

The historical usage of contact identifiers need not be limited to use within communication applications on the device 201. The historical usage of contact identifiers could relate to the use of contact identifiers, such as contact names and messaging addresses 229, within other software applications 224 on the device 201. For example, the usage data 241 may include usage from software applications 224 such as a calendar application, notepad application, word processing application, Web browser, media player application, or combinations thereof. For example, if the name Vesper Martin is the name of a contact stored in the personal address book database, global address book database, or application history of a communication application, the use of this name in the notepad application or other non-communication application 224 may be tracked and added to the usage data 241, which may or may not be associated with a respective contact record 302 described below.

In some embodiments, the usage data 241 identifies a last used messaging address, a list of the recently used messaging addresses, the most frequently used messaging address, or a list of the frequently used messaging addresses. The list of recently used messaging addresses could be limited to a predetermined number (e.g., 5 or 10) of the recently used messaging addresses, possibly in descending order from the last used. The list of frequently used messaging addresses could be limited to a predetermined number (e.g., 5 or 10) of the frequently used messaging addresses, possibly in descending order from the most used.

In some embodiments, the list of frequently used messaging addresses or list of recently used messaging addresses may be ordered as described above and displayed in groups of a predetermined size (the size of which may be configurable). The device user can then move through the respective list in groups. For example, when a group of ten contacts is displayed, the user may be provided with a selectable option such as "Next", "Show me the next group" or "Show me the next ten" to move to the next group of contacts. Similarly, the user may be provided with a selectable option such as "Previous", "Show me the previous group" or "Show me the previous ten" to move to the previous group of contacts where the user the first group of ten contacts is no longer displayed. This grouping functionality may be useful with larger address books.

In some embodiments, for types of electronic message having more than one address field (such as email messages which can have any one or more of a 'To' field, 'Cc' field and 'Bcc' field), the usage data 241 may include historical usage data specific to each type of address field. This allows custom filtering for each type of address field, taking advantage of differences in messaging behaviour in respect of each address field when applying filter criteria.

When an electronic message is sent to a messaging address or received from a messaging address, or content is exchanged via contact identifiers, the messaging application 226 records or updates usage data 241 stored in memory, such as the flash memory 244. The usage data 241 may be used by the messaging application 226 to filter messaging addresses for an electronic message which are displayed when an electronic message is composed at a later time. For example, when a user selects an option within the messaging application 226 to compose an electronic message, the messaging application 226 may automatically display a list of messaging addresses for the electronic message which have been filtered based on the usage data 241.

The software applications 224 may include a range of other applications, including, for example, a calendar application, and/or a notepad application. In some embodiments, the software applications 224 include a push content viewing application, a voice communication (i.e. telephony) application, a map application, and a media player application. Each of the software applications 224 may include layout information defining the placement of particular fields and graphic elements (e.g. text fields, input fields, icons, etc.) in the user interface (i.e. the display device 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the mobile communication device 201 also includes a memory module such as a removable memory card 230 (typically comprising flash memory) and a memory card interface 232. Network access may be associated with a subscriber or user of the mobile communication device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile communication device 201 in order to operate in conjunction with the wireless network 101.

The mobile communication device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

The mobile communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 242. A user of the mobile communication device 201 may also compose data items, such as email messages, for example, using the touch-sensitive overlay 206 in conjunction with the display device 204 and possibly the control buttons 260 and/or the auxiliary I/O subsystems 250. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display device 204 may also be used to provide an indication of the identity of a calling party, duration of a voice call, or other voice call related information.

Figure 3:
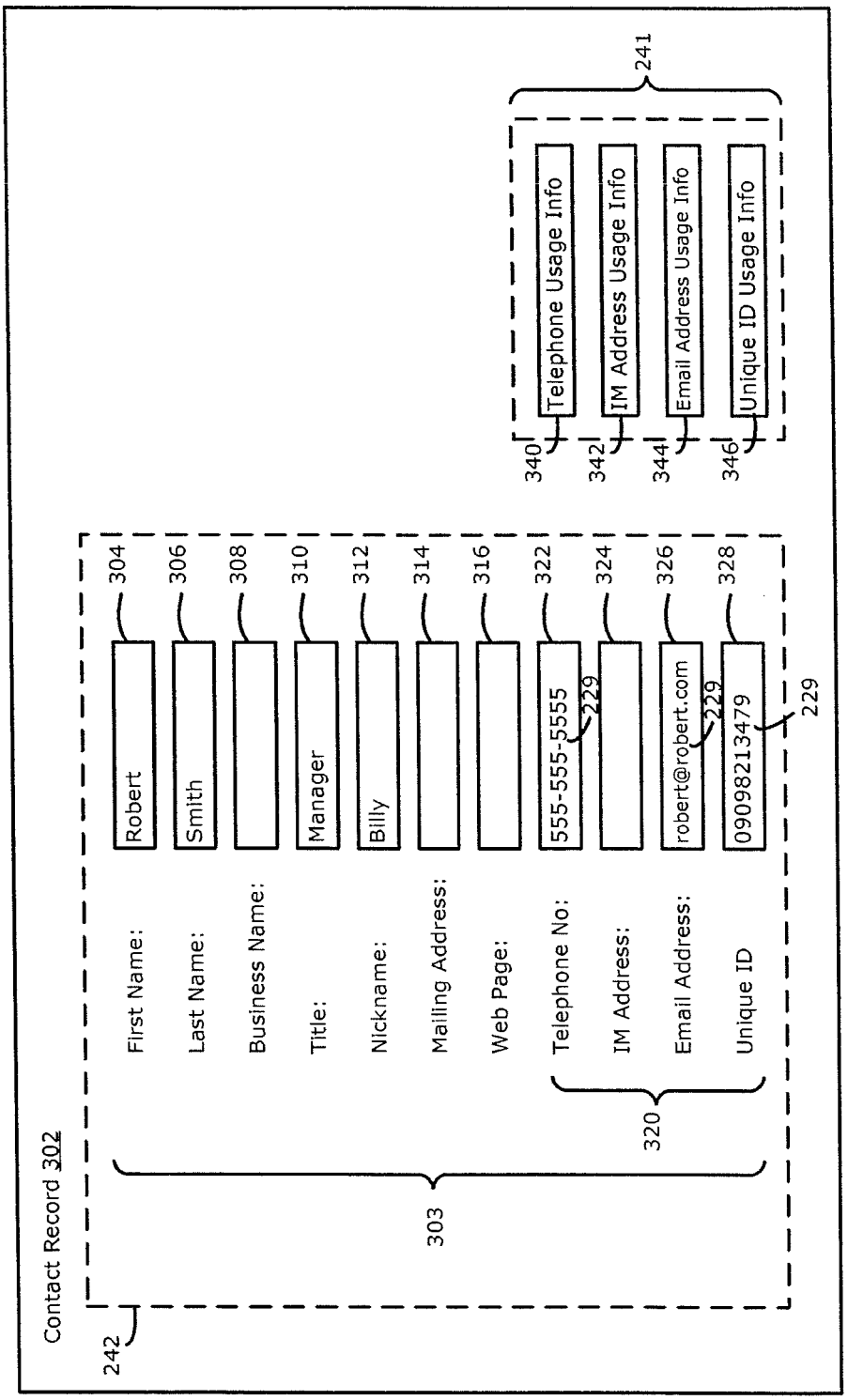
FIG. 3 is a block diagram illustrating an example contact record with which example embodiments of the present disclosure can be applied.

Referring now to FIG. 3, an example contact record 302 with which example embodiments of the present disclosure can be applied will now be described. The contact record 302 shown in FIG. 3 illustrates the data structure of a contact record 302 rather than a user interface representation of the contact record 302. The GUI of a mobile communication device 201 may display a contact record 302 differently from that shown in FIG. 3, and may display more or less than the illustrated fields. For example, usage data 241 need not be displayed with the GUI provided by the device 201.

The contact record 302 includes a plurality of fields 303, including a first name field 304 which may be used for storing a contact's given name; a last name field 306 which may be used for storing a contact's surname; a business name field 308, which may be used to store the name of a company associated with the contact; a title field 310, which may be used to store the contact's job title; a nickname field 312, which may be used to store a nickname for the contact, such as an abbreviated form of the contact's given name; a mailing address field 314, which may be used to store a postal address associated with the contact; a web page field 316, which may be used to store the address of a web page associated with the contact.

The contact record 302 also includes one or more messaging address fields 320 which may be used to store one or more messaging addresses 229 which may be used to send an electronic message to the contact. For example, the messaging address field 320 may include one or more of a telephone number field 322, which may be used to store a telephone number which is associated with the contact and through which the contact may receive an SMS text message or MMS message; an instant messaging field 324, which may be used to store an instant messaging address associated with the contact; an email address field 326 which may be used to store an email address associated with the contact; and/or a unique identifier field 328 which may be used to store a unique identifier for sending device-to-device messages (also referred to as peer-to-peer messages or PIN messages). The unique identifier is different from the telephone number of the mobile communication device 201 and typically has a proprietary addressing format which may vary depending on the embodiment.

As will be appreciated to persons skilled in the art, device-to-device messages require software support on the mobile communication device 201. Accordingly, not all mobile communication devices 201 have the software required for message addressing using non-telephonic unique identifiers. Thus, it is possible that at least some of a user's contacts do not have a unique identifier. In such cases, device-to-device messages cannot be sent to such contacts and the unique identifier field 328 of the corresponding contact record 302 will be empty and possibly hidden depending on the GUI settings of the device 201.

The unique identifier stored in the unique identifier field 328 uniquely identifies a mobile communication device 201. The unique identifier may be, but is not limited to, a personal identification number (PIN) which is associated with a communication device associated with a contact, the contact, or both. The PIN may be numeric or alphanumeric. In some embodiments, the PIN is assigned to the contact's mobile communication device during its manufacturing. The PIN functions as an address for communicating with the contact's mobile communication device. That is, messages sent to a PIN will be received at the contact's mobile communication device associated with that PIN. The PINs of the mobile communication devices 201 are not published as may occur with telephone numbers. Typically, a PIN must be shared between users. Accordingly, contacts having a mobile communication device 201 which supports PIN addressing but have not shared their PINS will have a corresponding contact record 302 with an empty unique identifier field 328 which may be hidden depending on the GUI settings of the device 201.

Device-to-device messages are sent using a carrier's wireless network infrastructure without interacting with the wireless connector system 120 as with email messages and other electronic messages. Depending on the architecture, if the carrier's wireless network infrastructure does not support PIN addressing a third party relay service which supports PIN addressing may be required. The relay service provides routing services and stores routing information required to route device-to-device messages from a sending device to one or more receiving device(s) using the carrier's wireless network infrastructure. The routing information comprises address mappings of device PINs (or other unique identifiers) to another form of device address supported by the carrier's wireless network infrastructure including, but not limited to, IP addresses of the mobile communication devices.

As will be appreciated by persons skilled in the art, device-to-device messages and unique identifiers associated with recipient electronic devices used for addressing PIN messages are typically stored on the mobile communication device 201 in the personal address book database and not stored in the global address book database of the wireless connector system 120 or synchronized with a user's host computer 117. Accordingly, PIN-based filtering is typically only possible on a supported mobile communication device 201. In some embodiments, PINs may be stored by the messaging server 132 for the supported mobile communication devices 201 but not stored in the global address book database of the wireless connector system 120 or synchronized with a user's host computer 117. However, it is possible that in other embodiments PINs are stored in the global address book database of the wireless connector system 120 and synchronized with a user's host computer 117.

It will be appreciated that the contact record 302 may include more or less information than that described above with reference to FIG. 3. In some cases, some types of the contact information 242 specified above may contain multiple entries. For example, a contact may have more than one email address. It will also be appreciated that, each field of the contact record 302 may not be populated for all contacts. That is, some of the fields in the contact record 302 may be left intentionally blank for some contacts. For example, in the example contact record 302 illustrated in FIG. 3, the business name field 308, the mailing address field 314, the web page field 316 and instant messaging address field 324 have not been populated.

The contact records 302 in the contact information database may be indexed using one or more of the fields 303 of the contact record 302. For example, in some embodiments, the contact records 302 are indexed based on the contents of the first name field 304. In other embodiments, the contact records 302 are indexed based on the last name field 306.

In some embodiments, the contact records 302 may include the usage data 241 associated with the respective contact record 302. The usage data 241 includes usage information specifying the historical usage of the messaging addresses 229 and possibly other contact identifiers of the contact records 302 such as the contact name 304, 306. The usage data 241 could specify the frequency with which contact information associated with a contact record 302 is used regardless of the type of contact identifiers/contact information. In such embodiments, the usage data 241 is a cumulative value based on the use of multiple types of contact information associated with the contact record 302 not merely a particular messaging address. Where the usage data 241 specifies a frequency of use, this frequency is based on the use of multiple types of contact identifier found in the contact record 302, possible based on all types of contact identifiers found in the contact record 302.

In some embodiments, the usage data 241 stored in the contact records 302 specifies the frequency of use of one or more messaging addresses 229. For example, the usage data 241 may specify the frequency of use of each of the messaging addresses 229 in the messaging address fields 320. In the shown embodiment, the usage data 241 includes telephone usage information 340 which specifies historical usage information for the telephone no. in the telephone number field 322, instant messaging usage information 342 specifying historical usage information for the instant messaging address associated with the instant messaging address field 324, email address usage information 344 which specifies historical usage information for the email address associated with the email address field 326, and unique identifier usage information 346 which specifies historical usage information for the PIN or other unique identifier associated with the unique identifier field 328.

The usage data 241 may specify the total number of uses of the associated messaging address 229, the number of uses of the associated messaging address 229 over a predetermined period of time, or both. In some embodiments, the usage data 241 may include a log specifying the usage of the associated messaging addresses 229, possibly within a predetermined duration. The log may include details such as the time and/or date of each use of the messaging address 229, the last time each messaging address 229 was used, or both.

While the contact records 302 of the database may be used for storing at least some of the usage data 241 in some embodiments, in other embodiments, the usage data 241 or parts thereof may be stored elsewhere. For example, in some embodiments a portion of the memory 244 (FIG. 2) apart from the database storing the contact records 302 may be reserved for storing the usage data 241. In some embodiments, the usage data 241 in this reserved portion of the memory 244 may store the messaging addresses 229 which have been recently used by the mobile communication device 201. As will be explained in greater detail below, the usage data 241 may be used by the messaging application 226 of the mobile device 201 to filter messaging addresses which are displayed when composing an electronic message.

Where the device 201 provides for the communication of electronic messages of more than one category (i.e., email message, SMS message, IM), the usage data 241 in the reserved portion of memory may include one or more recently used messaging addresses for each category of electronic message. For example, where the device 201 provides for both SMS-based text messaging and email messaging, the usage data 241 may include a last used SMS address which specifies the most recently used SMS messaging address, a last used email address which specifies the most recently used email address, and a last used PIN.

A user's interaction with the device 201 may be facilitated through the use of a graphical user interface (GUI), which may be implemented by the operating system 222 and/or the applications 224 such as the messaging application 226. The applications 224 may include layout information defining the placement of particular fields and graphic elements (e.g. text fields, input fields, icons, etc.) in the user interface (i.e. the display device 204).

Figure 4:
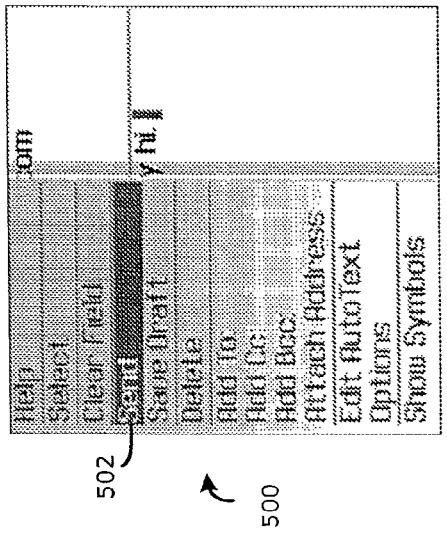
FIGS. 4 to 8D are screen captures of example message composition user interface screens of a messaging application with which example embodiments of the present disclosure can be applied.

Example graphical user interface screens will now be described. FIG. 4 illustrates a message composition user interface screen 400 for the messaging application 226 in which a user of the device 201 is permitted to compose an electronic message 404. The electronic message 404 includes an address field 402 which, in the example illustrated, is a 'To' field. In the example illustrated, the 'To' field has been populated with a messaging address 229 (i.e. robert@robert.com). In the example illustrated, the electronic message 404 in the message composition user interface screen 400 is an email message and the messaging address 229 is an email address. However, the electronic message 404 could be of a different type such as an SMS message, MMS message, IM message or device-to-device message (such as a PIN message).

After the user has finished composing the electronic message 404, they may wish to send it to the recipient identified by the messaging address 229 in the messaging address field 402.

Figure 5:
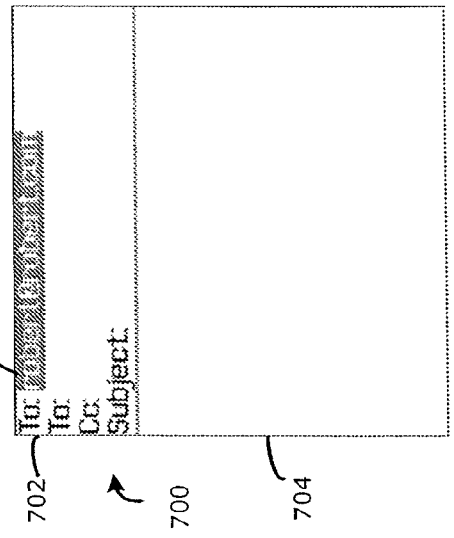

Referring now to FIG. 5 an example of a menu options screen 500 is illustrated. The menu options screen 500 includes a list of menu option items and may be activated by the user by interacting with the input devices 260 (FIG. 2) or the touchscreen overlay 206 (FIG. 2) in a predetermined manner. For example, the menu options screen 500 may be activated when the user presses a specific button on the device 201. The user of the device may select a 'Send' option item 502 by interacting with the input devices 260 or the touchscreen overlay 206. For example, in one embodiment, a user may use a navigation tool to navigate the options screen 500. When the user has highlighted the option that they want, they may depress the navigation tool to input a selection. When a user inputs the send option 502, the processor 240 (FIG. 2) receives the input and, in response, transmits the electronic message 404 (FIG. 4) to the recipient identified by the messaging address 229. The device 201 may communicate the electronic message 404 to the recipient via the communication subsystem 211 (FIG. 2).

When the Send option item 502 has been input, the processor 240 also automatically records or updates the usage data 241 (FIG. 2) in the memory, such as the flash memory 244 (FIG. 2). For example, the processor 240 may update the usage data 241 to indicate that the electronic message 404 was sent to the recipient identified by the messaging address 229 (FIG. 4).

Figure 6:
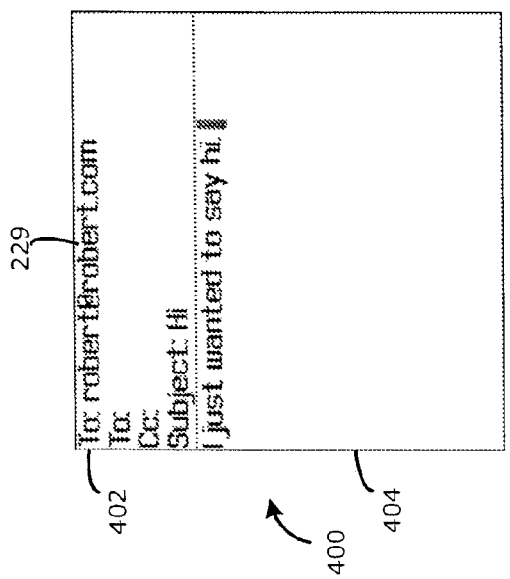

At a future time, the user of the device 201 may wish to compose another electronic message 404 (FIG. 4). Referring now to FIG. 6, an example message-composition options screen 600 is illustrated. The options screen 600 may be activated by the user by interacting with the input devices 260 (FIG. 2) or the touchscreen overlay 206 (FIG. 2) in a specific predetermined manner. For example, the options screen 206 may be activated when the user presses a specific button on the device 201.

The message-composition options screen 600 includes an option to compose an electronic message. In the example illustrated, the message-composition options screen 600 includes a 'Compose Email' option 602 which permits a user to compose an email message; a 'Compose PIN' option 604, which permits a user to compose a PIN message; a 'Compose SMS' option 606 which permits the user to compose a short messaging service message; and a 'Compose MMS' option 608 which permits a user to compose a multimedia messaging service message.

The user of the device 201 may select any one of the message-composition options by interacting with the input devices 260 or the touchscreen overlay 206. For example, in one embodiment, a user may use a navigation tool to navigate the options screen 600. When the user has highlighted the option that they want, they may depress the navigation tool to input a selection. When a user inputs an option to compose an electronic message of a specific category, such as the 'Compose Email' option 602, the processor 240 (FIG. 2) receives the input and generates a message composition user interface screen such as that shown in FIG. 4.

Figure 8A:
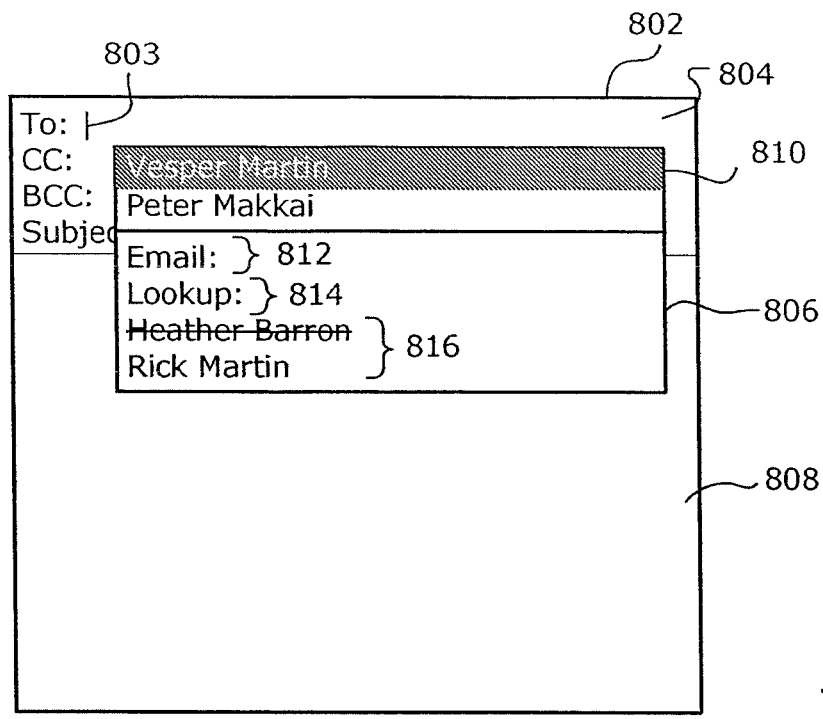
Figure 8B:
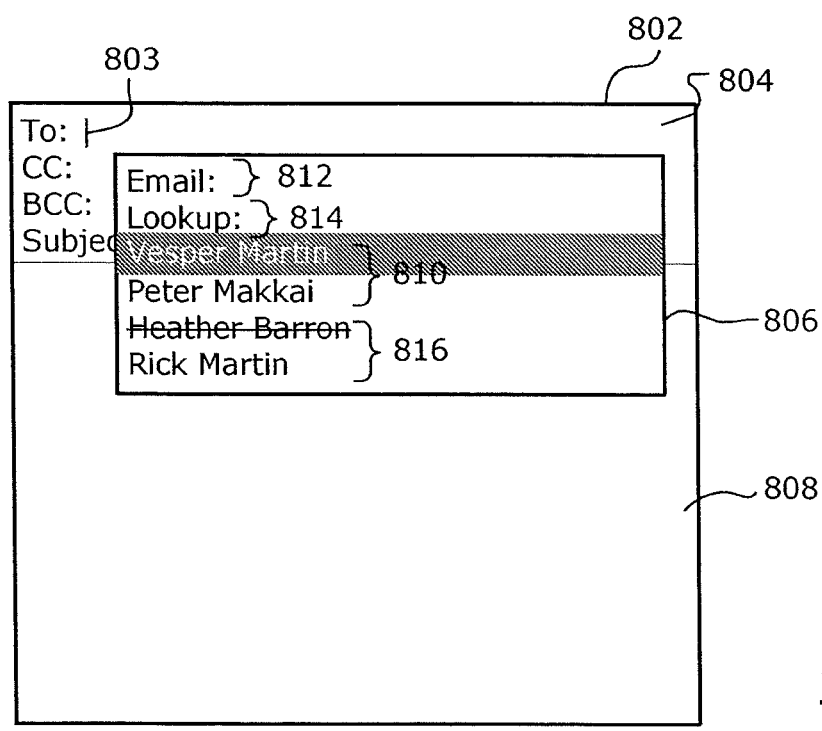

Referring now to FIG. 8A a second message composition user interface screen 802 for an email messaging application for the mobile communication device 201 in accordance with one embodiment of the present disclosure is illustrated. The teachings presented below could also be applied to message composition user interface screens for other messaging applications.

The user interface screen 802 may be generated when the user selects the "Compose Email" option 602 of FIG. 6. The user interface screen 802 includes an address portion 804 including a "To" address field, "CC" address field, "BCC" address field and "Subject" field. The operation and use of such fields is known in the art. The user interface screen 802 also includes a message body portion 808 for entry of a message. The user interface screen 802 is provided with a cursor 803 which is navigable within and between the respective fields of the address portion 804, and between the address portion 804 and message body portion 808. The location of the cursor 803 determines the active field of the user interface screen 802.

The processor 240 (FIG. 2) is configured to automatically filter contacts based on filter criteria to generate a first list of contacts 810 matching predefined filter criteria when one of the address fields of the address portion is active, i.e. when one of the "To" "CC" or "BCC" fields is the active field. The predefined filter criteria may be a type of electronic message being composed, usage criteria based on usage data 241, input in the active address field, or any combination thereof. The usage criteria may be a last used messaging address, a list of the recently used messaging addresses, the most frequently used messaging address, or a list of the frequently used messaging addresses. Typically, the predefined filter criteria includes at least the type of electronic message being composed.

The filtering may be performed automatically in response to selection of one of the address fields as the active field in the absence of user input other than selection of the active field, that is, before any portion of an address is input in the active address field. This allows, for example, a user to select an option within the messaging application 226 to compose an electronic message and the messaging application 226 will automatically display a list of messaging addresses for the electronic message which have been filtered based on the predefined filter criteria such as the type of electronic message being composed, the usage data 241 or both. When input in the active address field is received, the results may be re-filtered based on the input as described more fully below.

The first list of contacts 810 comprises one or more contact entries and is then displayed on the display screen 204. In at least some embodiments, the first list of contacts is displayed on the display screen 204 of the electronic device 201 at the same time as the message composition user interface screen.

In the shown embodiment, the first list of contacts 810 is displayed within an overlay menu 806 overlaying the screen 802. In other embodiments, the contents of the overlay menu 806 could be integrated within the user interface screen 802 and presented "inline" rather than in the overlay menu 806. The active field in the overlay menu 806 is shown using a focus which highlights the active field. The focus is an onscreen position indicator similar to cursor 803 used for selecting menu items via corresponding navigation and selection input via the input devices 260 or the touchscreen overlay 206. In the embodiments shown in FIGS. 8A to 8D, the contact entry for "Vesper Martin" is selected and highlighted using the focus.

The first list of contacts 810 may be ordered alphabetically or in descending order based on the usage data 241 applied as part of the filter criteria. For example, when the filter criteria includes filtering contacts for recently used contact identifiers (e.g., messaging addresses 229), the first list of contacts list 810 may be ordered in a descending order from the last used. Similarly, when the filter criteria includes filtering contacts for frequently used contact identifiers (e.g., messaging addresses 229), the list 810 may be ordered in a descending order from the most used.

A second list of contacts 816 comprising one or more contact entries which do not match all of the predefined filter criteria may be also displayed in some embodiments. In the shown embodiment, the second list of contacts 816 is displayed below the first list of contacts 810 matching the filter criteria. The second list of contacts 816 comprises contacts which do not match all of the filter criteria but match some of the filter criteria. For example, when the predefined filter criteria is the type of electronic message and there is input in the active address field, the second list of contacts 816 may contain contacts whose name or other information matches input in the active address field but for whom there is no messaging addresses 229 which matches the type of electronic message being composed. Alternatively, when the predefined filter criteria is the type of electronic message being composed and the most frequently of used or most recently used contacts, the second list of contacts 816 may contain contacts which are most frequently used or most recently used but for whom there is no messaging addresses 229 which matches the type of electronic message.

The second list of contacts 816 is typically ordered alphabetically. The second list of contacts 816 is optional and could be omitted in other embodiments. When the second list of contacts 816 is defined only by contacts matching the input in the active address field, it need only be displayed when input is entered in the active address field or an empty list may be displayed.

The second list of contacts 816 allows the device user to view other contacts for which the user has contact information 242 but which do not match the filter criteria. If the user wishes to message such contacts, the user can then change the type of message being composed to include these contacts. For example, where the filter criteria includes the type of message addressing of the contact and/or the type of electronic message, only contacts with an email address match the filter criteria and only these contacts will be displayed in the first list of contacts 810. However, contacts having other types messaging addresses, such as a mobile telephone number for SMS or MMS messages, PIN for PIN message, or IM address for an IM message, may be displayed in the second list of contacts 816.

In the shown embodiment, the contacts in the list 810 and 816 are displayed by name, but could be displayed using the corresponding messaging address 229 matching the contact name, or both, depending on the settings or embodiment.

In the shown embodiment of FIG. 8A, the first list of contacts 810 of contacts matching the predefined filter criteria is located at the top of the overlay menu 806 to facilitate faster and more convenient selection of the filtered contacts. In the shown embodiment, an input field 812 for accepting user input in the active address field and a lookup field 814 are provided below the first list of contacts 810 in the overlay menu 806. The input in the active address field operates as input for the input field 812 and lookup field 814. Selecting the input field 812 will accept the input in the active address field. Selecting the lookup field 814 will perform a remote lookup operation in the global address book database for the input in the active input field.

Figure 8C:
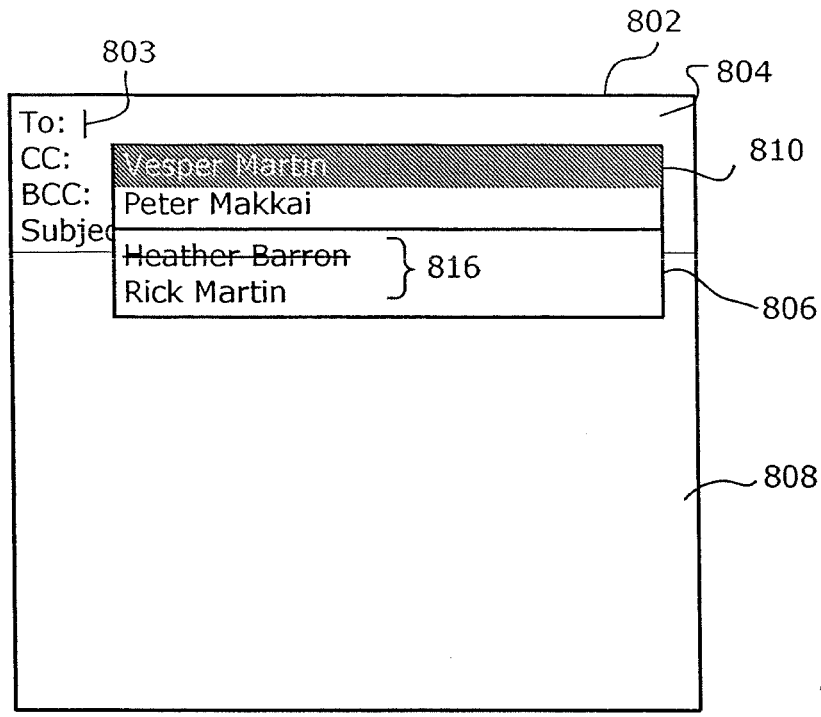
Figure 8D:
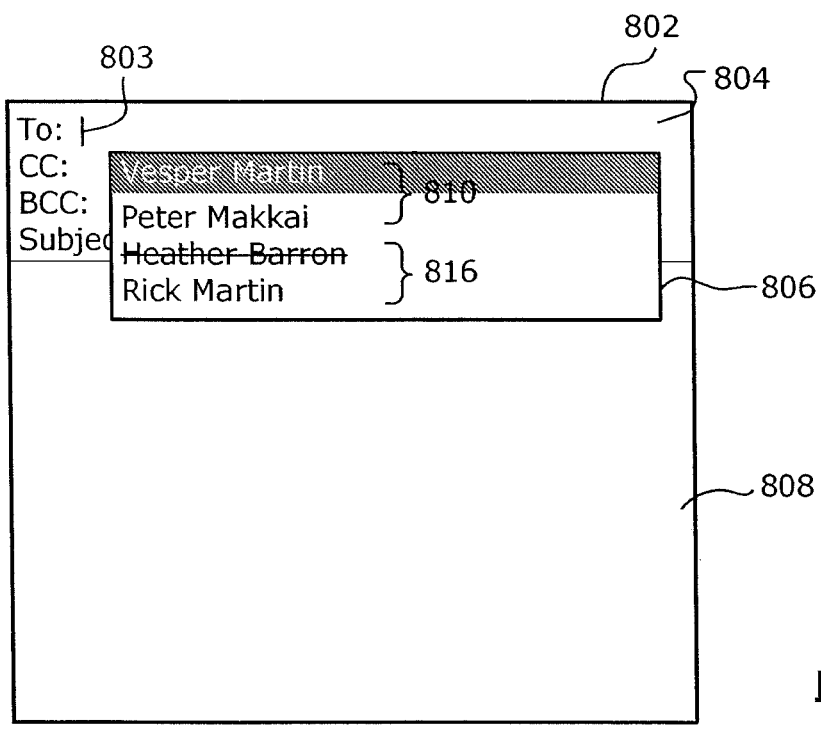

The fields 812 and 814 are optional and could be omitted in other embodiments. FIGS. 8C and 8D illustrate examples of alternative embodiments in which the fields 812 and 814 are omitted. In FIG. 8C, a linear separator provides a visual separation between contacts matching the filter criteria, and contacts which do not match the filter criteria. In FIG. 8D, no linear separator is provided. In yet other embodiments, only matching contacts are displayed.

In the embodiment shown in FIG. 8A, the fields 812 and 814 are provided below the first list of contacts 810 and above the list 816. However, in the embodiment shown in FIG. 8B the fields 812 and 814 are provided at the top of the overlay menu 808 above both the list 810 and list 816.

In the embodiment shown in FIG. 8A, when the filter criteria includes the type of electronic message, contacts having a matching messaging address type are shown in a first format whereas contacts which do not have a matching messaging address type are shown in a second format different than the first format. The second format for non-matching contacts may comprise a different text colour (e.g., the text being greyed out), a different background colour, a different font style (e.g. using strikethrough), a different font type, a different font size, or any combination thereof. For example, in the embodiments shown in FIGS. 8A to 8D, an email message is being composed and contacts which have an email address are shown using without strikethroughs and contacts which do not have an email address are shown using strikethroughs. The described changes in the visual appearance of displayed contact entries may be used in any embodiment described in the present disclosure.

Changes in the visual appearance of displayed contact entries provide a visual indication or notification that the respective contacts do not have a matching messaging address. In response to such notification, the user can change the type of message being composed, or send a further electronic message in a different type after the message under composition has been sent. The format in which contacts which do not have a matching messaging address type are shown may vary depending between embodiments and possibly in dependence on the type of messaging address(es) which are available for the respective contacts.

In some embodiments, in addition to or instead of using differences in the visual appearance between matching and non-matching contacts, contacts having a messaging address which matches the type of message being composed are selectable, whereas contacts which do not have a messaging address that matches the type of message being composed are not selectable. This allows the selection of a contact for which there is a matching messaging address type, while notifying the user that other contact information and possibly an alternative type of messaging address is available for such contacts. In response such notification, the user can change the type of message being composed, or send a further electronic message in a different type after the message under composition has been sent. For example, when the electronic message under composition is an email message, contacts having an email address are displayed in selectable form. Other contacts without an email address are shown in non-selectable form.

Referring again to the active address field, entry of an input in active address field causes the processor 240 to perform a local lookup operation in the personal address book database or possibly application history, or both. The lookup operation is based on the input in the address field and identifies contacts matching the input. When analysing the personal address book database, the lookup operation comprises comparing the input to one or more fields of the contact records 302. Typically, the fields used in the comparison are the name field and, when the type of electronic message is one of the filter criteria, the corresponding messaging address field 320 (e.g., the email address field when the electronic message under composition is an email address field 326). Changing the active address field may cause any unresolved input in the active address field, i.e. input which has been used to select a contact, to be discarded. A warning message and prompt may be presented to the user in response to input changing the active address field. In such cases, the active address field is only changed when confirmatory input to proceed with the change in the active address field is received in response to the prompt.

Figure 7:
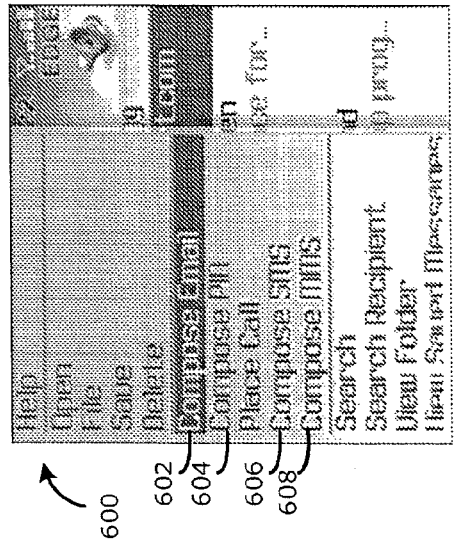

Referring now to FIG. 7 a further message composition user interface screen 700 is illustrated. This screen may be generated when the user selects the "Compose Email" option 602 of FIG. 6. The screen 700 contains an electronic message 704. The electronic message 704 includes an address field 702 which, in the example illustrated, is a 'To' field. In the embodiment of FIG. 7, rather than filtering and displaying a list of messaging addresses, the processor 240 automatically populates the address field 702 with one or more messaging addresses based on the usage data 241. The processor 240, in effect, predicts the message recipient(s) based on the usage data 241. The processor 240 may also automatically select the automatically populated contents of the address field 702. The automatic selection typically comprises highlighting or otherwise changing the appearance of the selected contents of the address field 702. When the contents of the address field 702 are selected, the contents are more easily modified. For example, by merely inputting a single character, the entire contents of the field may be deleted. Thus, while the processor 240 makes a prediction as to the recipient(s) of the electronic message, it permits a user to easily override that prediction.

Figure 9:
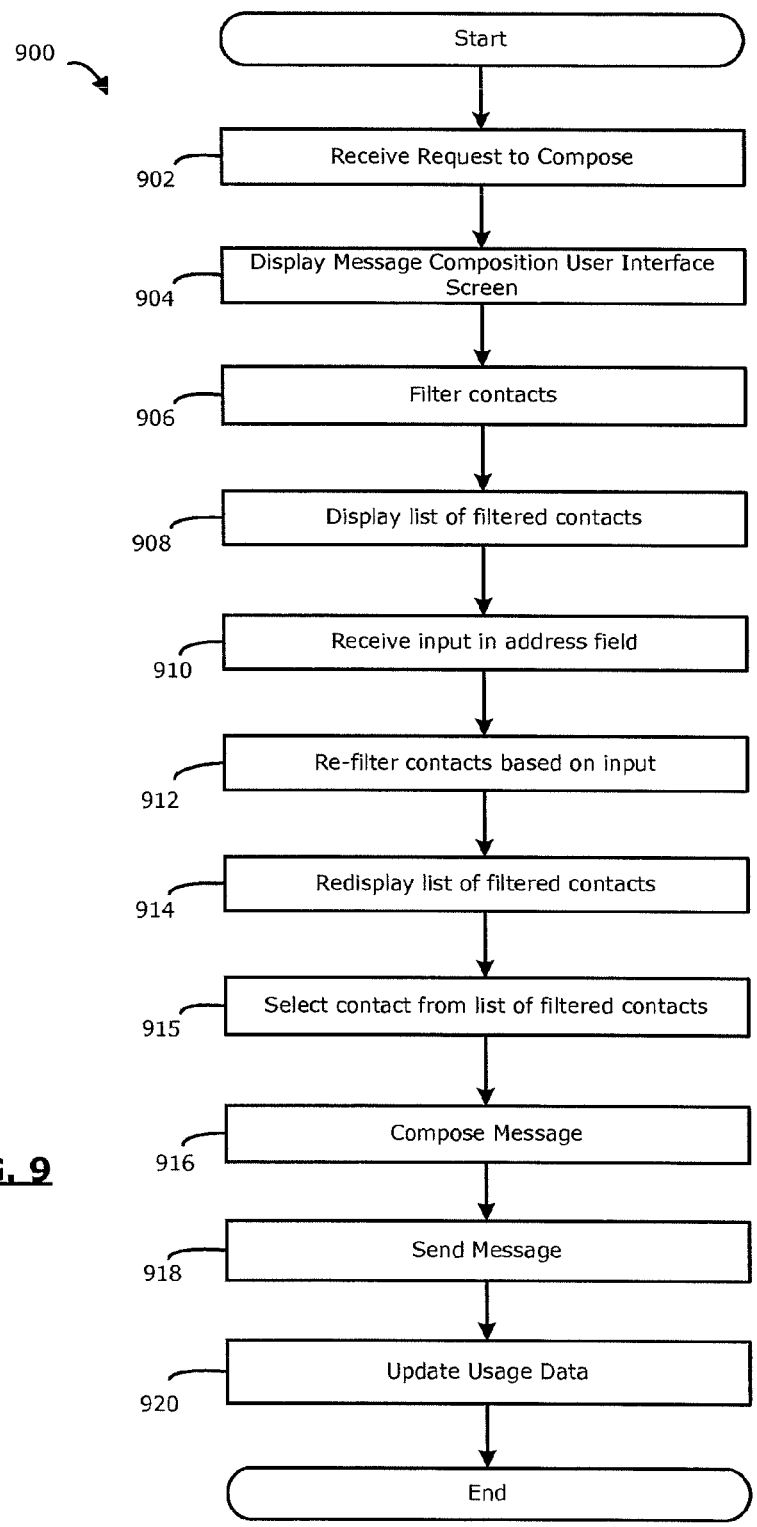
FIG. 9 is a flowchart illustrating an example method for predicting messaging addresses for an electronic message composed on an electronic device in accordance with one embodiment of the present disclosure.

Reference will now be made to FIG. 9 which illustrates a flowchart of a process 900 for predicting messaging addresses for an electronic message composed on an electronic device in accordance with one embodiment of the present disclosure. The process 900 may be performed by a mobile communication device 201 (FIG. 2), and more specifically, by the processor 240 (FIG. 2) and/or messaging application 226 (FIG. 2) associated with the mobile device

201. In the example, embodiment the messaging application 226 is an email messaging application but could be another type of messaging application or possibly an integrated messaging application for sending more than one type of electronic message such an integrated messaging application for sending any two or more of email, SMS, MMS, PIN or IM messages.

The mobile communication device 201 composes an electronic message by translating a series of inputs received from the input devices 260 (FIG. 2) or touchscreen overlay 206 (FIG. 2) to a series of alphanumeric characters as known in the art. The electronic messages comprise a plurality of fields comprising at least one address field for inputting or populating one or more message recipients, and a message body field for populating with the body or substance of the message. The message recipients may be identified by contact names or messaging addresses. For some categories of electronic messages, the address field is a 'To' field and may further include a carbon copy ('Cc') field for specifying one or more secondary recipients of the electronic message, and/or a blind carbon copy ('Bcc') field for specifying one or more secondary recipients of the electronic message who will not be displayed to the recipients in the 'To' field or the 'Cc' field. The electronic message may also include a subject field which may be used to specify a brief summary of the contents of the message.

First, at step 902 a request to compose an electronic message is received from a user via the input devices 260 (FIG. 2) or the touchscreen overlay 206. Next at step 904, in response to the request to compose the electronic message being received, an electronic message composition user interface screen such as the screen 802 is displayed on the display 204 of the device 201.

Next, at step 906 the processor 240 (FIG. 2) filters the contacts from one or more messaging address sources based on predefined filter criteria. The messaging address sources may be any combination of contact information 242 stored in the contact information database stored on the device 201, contact information 242 stored in the contact information database stored on a remote server such as the messaging server 132, or an application history for an application such as a messaging application 226.

The filtering may be triggered by the display of the electronic message composition user interface screen and/or selection of an address field of the screen 802 as the active field. The filtering is initially performed automatically in the absence of user input such as the entry of one or more initial characters of a contact name or messaging address of a recipient in the active address field, or other input. That is, the filtering is initially performed before the user begins entering a name or address of a message recipient. This can be contrasted with "auto-complete" features which are based on user input.

The predefined filter criteria may comprise a type of the messaging address, usage criteria based on historical usage data associated with the contacts, or both, depending on the device settings and/or embodiment. The predefined filter criteria are stored in the memory of the device 201. The usage criteria is based on the usage data 241 which, depending on the settings and/or embodiment, may filter contacts to identify a last used contact, a list of the recently used contacts, the most frequently used contact, or a list of the frequently used contacts. As described above, the list of recently used contacts could be limited to a predetermined number the (e.g., 5 or 10) of the recently used contacts, possibly in descending order from the last used. The list of frequently used contacts could be limited to a predetermined number the (e.g., 5 or 10) of the frequently used contacts, possibly in descending order from the most used.

The recently used and frequently used contacts may be determined in dependence on the type of electronic message being composed, or independent of the type of electronic message being composed. For example, when composing an email message the most recently used and most frequently used contacts may be limited to contacts having email addresses, or may consider messaging addresses of other types of electronic messages or possibly contact identifiers which are not messaging addresses.

When the recently used or frequently used contact is determined independent of the type of electronic message being composed, the recently used or frequently used messaging address or other contact identifier is determined irrespective of its type. A lookup operation is then performed in which the recently used or frequently used messaging address other contact identifier is compared to other contact information 242 to identify a messaging address 229 for the same contact for the type of electronic message being composed. When no messaging address for the type of electronic message being composed is found for the contact, the lookup operation fails.

In some embodiments, the messaging application 226 could include settings for configuring the filter criteria such as "Show only contacts matching message type", "Show recently used contacts" and "Show frequently used contacts". In some embodiments, any one or more of these option settings may be set or enabled at the same time. The option "Show only contacts matching message type" will return only contacts having a messaging address which matches the type of electronic message under composition. The option "Show recently used contacts" will filter contacts based on the date and/or time of last communication defined in usage data 241. The option "Show frequently used contacts" will filter contacts based on a frequency defined in usage data 241.

Next, at step 908 a list of filtered contacts is displayed on the display 204 of the device 201, for example, in the list 810 of an overlay menu 806 overlaying the message composition user interface screen 802. As noted above, the contacts may be displayed by name, or messaging address, or both. The manner in which contacts are displayed may be determined by stored settings and could vary between contact entries in the list. The display options may be changed on demand in response to respective user input.

Although in the illustrated embodiment the electronic message composition user interface screen is displayed, contacts are filtered, and the list of filtered contacts is the displayed on the display 204 of the device 201, in other embodiments the filter may occur prior to displaying the electronic message composition user interface screen so that the list of filtered contacts is displayed on the display 204 at the same time as the electronic message composition user interface screen.

The contacts in the first list of contacts 810 could be displayed in order depending on the type of filter criteria, if applicable. In some embodiments, the messaging application 226 could include user settings for displaying the filtered contacts in the first list of contacts 810 matching the filter criteria such as "Sort by recently used" for sorting contacts in a descending order from the last used and "Sort by frequently used" for sorting contacts in a descending order from the most used. Non-matching contacts could also be displayed as described above. The non-matching contacts may be displayed in a second list of contacts 816 below the first list of contacts 810 which match, typically in alphabetical order.

Alternatively, rather than displaying a list of contacts, in other embodiments one or more address fields of the message composition user interface screen are automatically populated with one or more contacts matching the filter criteria such as in the embodiment of FIG. 7. For categories of electronic messages which only have one address field, this address field is populated with the contacts matching the filter criteria. For categories of electronic messages which more than one address field, the active address field could be populated with the contacts matching the filter criteria. The active address field may be a default address field, such as the 'To' field, which becomes the active field when the message composition user interface screen is initially displayed. Alternatively, the active address field could be an address field selected after the message composition user interface screen is initially displayed in accordance with respective input via the input devices 260 (FIG. 2) or the touchscreen overlay 206. The address fields which are populated may be the 'To' field, 'Cc' field and/or 'Bcc' field. In yet other embodiments, more than one address field may be populated, for example, may based on historical usage of contacts associated with the respective address fields stored in the usage data 241.

Next, at step 910 the device 201 may receive input in the active address field from the input devices 260 (FIG. 2) or the touchscreen overlay 206 (FIG. 2). The input could be a selection input of an address field such as a selection of one of the To' field, 'Cc' field or 'Bcc' field, a character input of one or more initial characters of a messaging address or contact name for the electronic message, or both. For example, the user of the device 201 may enter one or more characters of a name or messaging address 229 in one of the address fields for the electronic message to further filter the contacts in the list 810 and the list 816.

Next, at step 912, in response to receiving the input at step 910, the processor 240 (FIG. 2) further filters the contacts to further limit the matching contacts. Accordingly, the resultant list 810 of contacts is based on both the input in the address field and the predefined filter criteria. The filtering at step 912 comprises comparing the input in the address field to the one or more messaging address source(s) being used. As the input in the address field changes (e.g., more characters are added or characters are removed or changed), the messaging application 226 re-compares the input in the address field to the contact information to dynamically determine the list 810 of contacts based on the input in the address field and the predefined filter criteria. The list 816 is also filtered in that a further lookup is performed with regarding to the input in the address field; however, the filter criteria are not considered.

Next, at step 914, the processor 240 (FIG. 2) redisplays the list of contacts on the display 204 in accordance with the re-filtered contacts, for example, in the overlay menu 806 overlaying the message composition user interface screen 802. An updated list of contacts 816 is also redisplayed. Alternatively, the address field of the electronic message may be repopulated.

Next, at step 915 a messaging address 229 is selected in accordance with selection of a contact from the first list of contacts 810. Selecting input may involve focusing the contact with the onscreen position indicator when it is not already focus and predetermined selection input such as depressing a depressible scroll wheel or trackball used as a navigation tool such as a depressible scroll wheel or trackball, depressing a corresponding key such as the "ENTER" key or other predetermined selection input. The active address field in the message composition user interface screen is then populated with the selected contact, typically with the contact name but possibly the messaging address instead, but possibility in addition to, the contact name. Steps 906 to 914 could then be repeated to select multiple contacts.

Next, at step 916 one or both of a subject field and message body field of the electronic message may be populated, depending on the type of the electronic message.

Next, at step 918, the mobile communication device 201 sends the electronic message to its recipients. As explained above with references to FIG. 4, the message is typically sent in response to the user of the device 201 selecting an option to send the electronic message using the input devices 260 (FIG. 2) or touchscreen overlay 206 (FIG. 2). In response to receiving an input to send the message, the mobile device 201 sends the electronic message through the wireless network 101 using the communication subsystem 211 (FIG. 2).

Next, at step 920, after the electronic message is sent, the mobile communication device 201 updates the usage data 241 (FIG. 2) in its memory 244 (FIG. 2) based on the messaging addresses to which the electronic message 404 was sent at step 918. In embodiments in which the usage data 241 is stored in a contact record 302 (such as the embodiment of FIG. 3), updating the usage data 241 may include updating the contact record 302 associated with the messaging address to which the electronic message was sent at step 918. The updating of the usage data 241 (FIG. 2) may include updating the log of messaging addresses to which electronic messages have been sent to include the date and/or time that the electronic message was sent in step 918.

In some embodiments, a copy of the electronic message 404 (FIG. 4) that was sent may be saved to the memory 244. The messaging application 226 may include a date field in the saved electronic message specifying the date and possibly the time when the electronic message was sent. The date field may, in some embodiments, act as the usage data 241.

The process 900 is particularly advantageous in the context of device-to-device messages (also referred to as peer-to-peer and PIN messages) and SMS and MMS messages. This is because device users typically have a limited number of contacts which whom they communicate via device-to-device messages and SMS/MMS messages compared with other types of electronic messages such as email messages. In the context of device-to-device messages, the number of contacts may be very limited due to the intimate nature of those communications. Device users typically only communicate with users who they are very close to, such as a family member or business partner. For example, device users typically have only a limited number of contacts with whom they communicate via device-to-device messages, say 3 or 4compared with potentially hundreds or thousands of contacts with whom they communicate via email messages.

In addition, unlike other types electronic messages, the unique identifier used for addressing PIN messages is typically an alphanumeric string (or a numeric or alphabetic string) without a secondary meaning. This makes it more difficult for users to remember the unique identifiers used for addressing PIN messages in contrast to email addresses which typically do have a secondary meaning since they are typically derived from user names and domain information. Telephone numbers used for SMS and MMS messages, while numeric strings, have a secondary meaning to device users in the context of messaging in that users already associate contacts with their telephone numbers from their telephone calls with those contacts. This secondary meaning does not exist for unique identifiers used for addressing PIN messages.

The process 900 is also advantageous in the context of an integrated messaging application for sending more than one type of electronic message such an integrated messaging application for sending any two or more of email, SMS, MMS, PIN or IM messages. This is because a common messaging application, i.e. integrated messaging application, is used for messaging with a plurality of electronic message types. Moreover, integrated messaging applications may provide an option to compose an electronic message for any supported type from a common user interface screen such as the message-composition options screen 600 of FIG. 6. This is because users may inadvertently choose the wrong type of electronic message.

While the process 900 has been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments. Moreover, while example categories of electronic messages and example address input fields are described, the teachings of the present disclosure can be applied to any type of electronic message and any type of address input field.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method for predicting messaging addresses for an electronic message composed on an electronic device, the electronic device having access to contact information for a plurality of contacts, the method comprising:
    detecting a request to compose an electronic message independent of another electronic message; and
    in response to detecting the request, automatically populating at least one address field for inputting message recipients in a message composition user interface, the at least one address field being automatically populated with a corresponding messaging address for at least one contact from the plurality of contacts, where the messaging address is selected for automatically populating the at least one address field based on usage data comprising at least historical usage of contact identifiers corresponding to the plurality of contacts, wherein the at least one address field is automatically populated with the corresponding messaging address without receiving a user selection of the corresponding messaging address, and wherein the at least one address field is pre-populated with the corresponding messaging address upon display of the message composition user interface to a user responsive to the request and prior to the user interacting with any input field of a message within the message composition user interface.

2. The method of claim 1, wherein the usage data specifies a number of uses over a predetermined period of time.

3. The method of claim 1, further comprising automatically filtering the plurality of contacts based on a type of messaging address.

4. The method of claim 1, further comprising sending the electronic message to one or more messaging addresses in response to a first input.

5. The method of claim 4, further comprising updating the usage data after the electronic message has been sent.

6. The method of claim 1, wherein the request to compose an electronic message is detected from a selection of a type of communication.

7. The method of claim 6, wherein a plurality of types of communication are provided in corresponding options in a menu of options.

8. The method of claim 6, further comprising automatically filtering the plurality of contacts based on the type of communication.

9. The method of claim 1, further comprising automatically highlighting the corresponding messaging address in the address field.

10. The method of claim 9, further comprising removing the highlighted corresponding messaging address after detecting a second input.

11. An electronic device configured to predict messaging addresses for an electronic message composed on the electronic device, the electronic device having access to contact information for a plurality of contacts, the electronic device comprising:
    a communication subsystem;
    a processor; and
    a memory storing computer executable instructions executed by the processor to: detect a request to compose an electronic message independent of another electronic message; and in response to detecting the request automatically populate at least one address field for inputting message recipients in a message composition user interface, the at least one address field being automatically populated with a corresponding messaging address for at least one contact from the plurality of contacts, where the messaging address is selected for automatically populating the at least one address field based on usage data comprising at least historical usage of contact identifiers corresponding to the plurality of contacts, wherein the at least one address field is automatically populated with the corresponding messaging address without receiving a user selection of the corresponding messaging address, and wherein the at least one address field is pre-populated with the corresponding messaging address upon display of the message composition user interface to a user responsive to the request and prior to the user interacting with any input field of a message within the message composition user interface.

12. non-transitory computer readable medium comprising computer executable instructions for predicting messaging addresses for an electronic message composed on an electronic device, the electronic device having access to contact information for a plurality of contacts, the computer readable instruction comprising instructions for:

detecting a request to compose an electronic message independent of another electronic message; and
  in response to detecting the request, automatically populating at least one address field for inputting message recipients in a message composition user interface, the at least one address field being automatically populated with a corresponding messaging address for at least one contact from the plurality of contacts, where the messaging address is selected for automatically populating the at least one address field based on usage data comprising at least historical usage of contact identifiers corresponding to the plurality of contacts wherein the at least one address field is automatically populated with the corresponding messaging address without receiving a user selection of the corresponding messaging address, and wherein the at least one address field is pre-populated with the corresponding messaging address upon display of the message composition user interface to a user responsive to the request and prior to the user interacting with any input field of a message within the message composition user interface.

13. The non-transitory computer readable medium of claim 12, wherein the usage data specifies a number of uses over a predetermined period of time.

14. The non-transitory computer readable medium of claim 12, further executing instructions to automatically filter the plurality of contacts based on a type of messaging address.

15. The non-transitory computer readable medium of claim 12, further executing instructions to send the electronic message to one or more messaging addresses in response to a first input.

16. The non-transitory computer readable medium of claim 15, further executing instructions to update the usage data after the electronic message has been sent.

17. The non-transitory computer readable medium of claim 12, wherein the request to compose an electronic message is detected from a selection of a type of communication.

18. The non-transitory computer readable medium of claim 17, wherein a plurality of types of communication are provided in corresponding options in a menu of options.

19. The non-transitory computer readable medium of claim 17, further executing instructions to automatically filter the plurality of contacts based on the type of communication.

20. The non-transitory computer readable medium of claim 12, further executing instructions to automatically highlight the corresponding messaging address in the address field.

21. The non-transitory computer readable medium of claim 20, further executing instructions to remove the highlighted corresponding messaging address after detecting a second input.

* * * * *